Oct. 31, 1944.  G. B. TAYLOR  2,361,717
PROCESS FOR MAKING POLYAMIDES
Filed Sept. 12, 1940   2 Sheets-Sheet 2
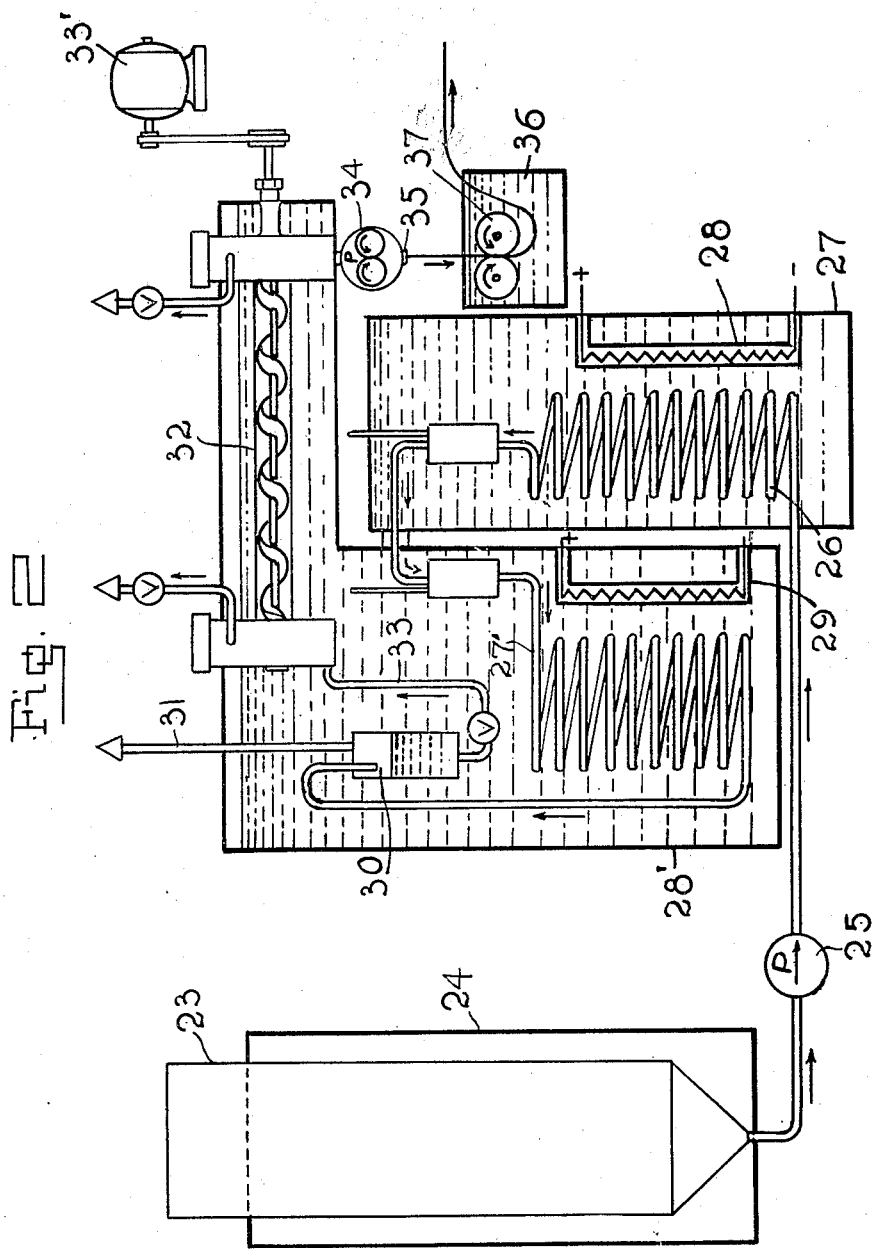
Inventor
Guy B. Taylor
By R. F. Miller
Attorney Patented Oct. 31, 1944

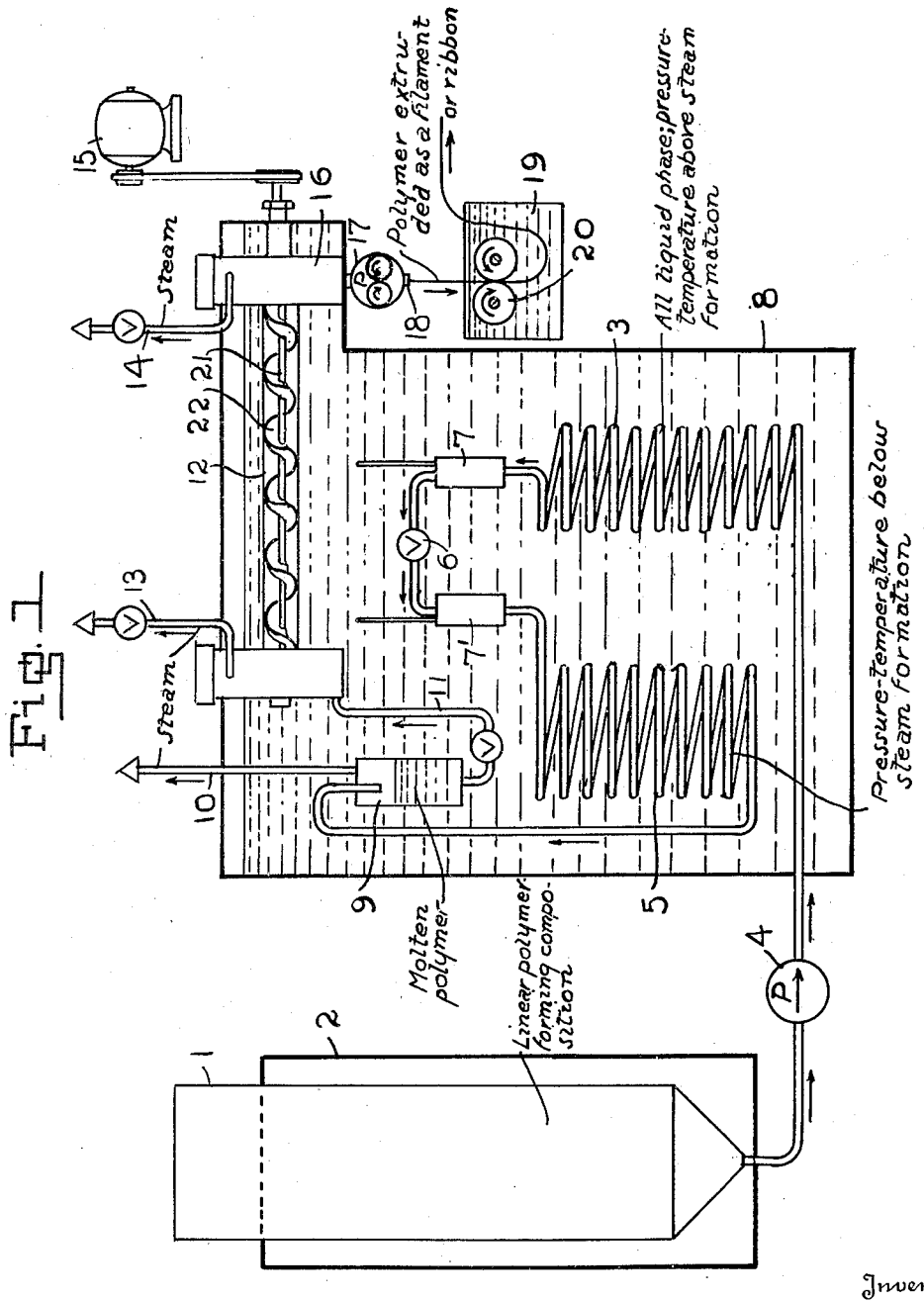

2,361,717

UNITED STATES PATENT OFFICE 2,361,717

PROCESS FOR MAKING POLYAMIDES

Guy B. Taylor, Wilmington, Del., assignor to E. I. du Pont de Nemours & Company, Wilmington, Del., a corporation of Delaware Application September 12, 1940, Serial No. 356,544

6 Claims. (Cl. 260—78)

This invention relates to synthetic linear polymers and more particularly to an improved method for their manufacture.

The present process is applicable to the manufacture of linear polymers from various types of reactants, such as described in Patent 2,071,250, which yield fiber-forming polymers. The new process described herein has as its most valuable application the production from these reactants of fiber-forming polymers, although the invention is not limited to the manufacture of the high molecular weight or fiber-forming polymers which are obtained by carrying the reaction more nearly to completion. Since the polyamides, described in more detail in patents 2,071,253 and 2,130,948, are among the most useful of the fiber-forming polymers, this invention is more particularly described in connection with these polymers.

It has been proposed to improve the process for making the polyamides by heating a solution or mixture in an aqueous medium of the polyamide-forming composition in an autoclave under pressure sufficient to prevent the escape of the steam formed, and after substantial reaction has taken place gradually lowering the pressure to remove the water as steam, and then further polymerizing the reaction mass by heating at atmospheric pressure or below. This method, however, is subject to several disadvantages. As one instance may be mentioned the fact that although batch operation from a theoretical standpoint permits direct extrusion of the molten reaction mass into finished articles, this practice, due mainly to the time factor, is not practical in commercial operation.

This invention has as an object an improved method and apparatus for making linear polymers. A further object is a method in which linear polymer-forming compositions are continuously converted into the finished polymer. A further object is a method which makes possible the continuous manufacture of linear polymers and the continuous extrusion of the formed molten polymer into the desired shape. Other objects will appear hereinafter.

The above objects are accomplished by a process comprising continuously feeding a liquid polymer-forming composition through a reaction zone at polymer-forming temperature and under pressure sufficient to maintain the composition liquid and prevent the formation of a vapor phase, and at such rate that the major portion of the composition has combined to form polymer, then passing the reaction product formed through a reaction zone where the polymerization is completed by maintaining the reaction mass under pressure-temperature conditions at which the volatile products are liberated, removing the volatile products, and continuously discharging the molten polymer.

As previously indicated, the invention is preferably carried out with liquid compositions comprising polyamide-forming reactants, e. g. a mixture of diamine and dibasic carboxylic acid or a polymerizable amino acid. The invention is most advantageously carried out with an aqueous solution of the polyamide-forming composition, as for example an aqueous solution of a diamine-dicarboxylic acid salt.

The invention will be more fully understood in connection with the accompanying drawings in which Fig. 1 is a diagrammatic view in elevation of apparatus suitable for carrying out my invention, and Fig. 2 is a similar view of apparatus adapted for carrying out the invention by a modified procedure.

In one embodiment of my invention a water solution of hexamethylene diammonium adipate from a feed tank 1, surrounded by a jacket 2 which may contain heating fluid to preheat the solution in the tank or maintain it fluid, is pumped to a coil 3 by a pump 4 under a pressure of 1000 lbs. or more. The liquid from the coil 3 passes to the coil 5 through the valve 6 where the pressure is reduced to 300 lbs. The numerals 7 and 7' indicate wells for the insertion of thermocouples or thermometers to determine the temperature of the reaction liquid passing through the coils. Both reaction coils are heated by immersion in a fluid bath maintained at 280–290° C. and contained in a tank 8 which may be heated by any suitable means. The pressure in coil 3 is chosen above the pressure of saturated steam at the temperature of the coil so that no steam can form in it up to the valve between the coils. Since the formation of steam in the coil 3 is prevented, the time for chemical reaction is governed by the pumping rate and by the volume of the coil. On passage of the liquid through the valve 6 with consequent reduction in pressure steam flashes in coil 5. Although the temperature of reaction mass may drop 50° C. or so just after passing the valve, the steam is quickly heated on its passage through coil 5 to a temperature approaching that of the surrounding bath. On leaving coil 5, the mixture of steam and polymer enters the trap 9 at the temperature of the surrounding bath and under the pressure in coil 5. Steam is continuously drawn off through the pipe 10 and the separated molten polymer is forced through the pipe 11 into one end of the screw conveyor 12 operated under essentially atmospheric pressure. The screw conveyor is also immersed in the bath in the tank 8 and maintained at approximately the temperature of the reaction coils. The shaft 21 carrying the worm 22 is rotated by a motor 15. The polymer is moved slowly through the screw conveyor to allow the small amount of retained water and the water vapor formed during the continued reaction to pass out through the valved pipes 13 and 14.

The finished molten polyamide collecting in the end 16 of the screw conveyor is forced by a gear pump 17 or by other suitable means through an extrusion head 18 provided with a suitable orifice to extrude the molten polymer in the form of a ribbon, filament or the like which is drawn through a water quenching bath 19 by rolls 20.

In the apparatus shown in Fig. 2 the liquid polymer-forming composition is pumped as before by pump 25 from the tank 23 surrounded by a heating jacket 24 through the reaction coils 26 and 27' under a pressure of about 300 lbs. gage. In this instance, however, the two coils are under the same pressure. Steam formation is prevented in coil 26 by heating it at a temperature insufficient to permit steam formation in a separate bath contained in tank 27 and heated by an electrical heating unit 28. The remainder of the apparatus, corresponding to that shown in Fig. 1, is immersed in a bath which is contained in the tank 28' and which is heated by electrical heating means 29 to a temperature sufficiently high to cause steam formation. The coil 26 is operated at a temperature of about 200° to 220° C., and the coil 27' at about 270° to 290° C. The steam separating from the polymer in the trap 30 passes out through the pipe 31 and the polymer is forced through valved pipe 33 into the screw conveyor 32 operated under atmospheric pressure by the motor 33'. The molten polymer collecting in exit end of the conveyor is pumped by a gear pump 34 through a suitable shaping orifice in the extrusion head 35, the extruded polymer being drawn through a quenching bath 36 by rolls 37.

In either of the methods described above, the polyamide-forming composition in aqueous solution or in other liquid form is continuously forced under superatmospheric pressure and at amide-forming temperatures through a reaction zone or compartment, which may consist of one or more suitable reaction coils 3 or 26, the conditions of pressure and temperature being such that the composition is maintained in the liquid state. The incompletely reacted product is then passed to a subsequent reaction zone in which the pressure and temperature conditions are such as to permit liberation of volatile product, this second zone or compartment including at least one reaction vessel, such as the coil 5 or 27' with traps 9 or 30, from which the volatile products are progressively removed from the separated polymer, and the pressure is reduced to atmosphere at the discharge end of the apparatus which in the form shown is a screw conveyor.

The following examples are illustrative of methods used in practicing the invention:

*Example I*

The apparatus shown in Fig. 1 was used, the bath in tank 8 consisting of fused alkali-nitrate automatically controlled at 285° C. The coils 3 and 5 were of ¼ inch stainless steel pipe, 18 and 36 feet in length, respectively. A 53% solution of hexamethylenediamine-adipic acid salt in water containing 1.5 mol per cent of acetic acid (viscosity stabilizer) based on the salt, was preheated to about 100° C. in tank 1 and forced into coil 3 at a rate of 33 grams per minute for five hours. The operating pressures were 1175 lbs. in coil 3, 300 lbs. in coil 5 and trap 9, and 0 to 5 lbs. gage in the screw conveyor. Temperatures registered on the inside of the apparatus were: 283° C. and 240° in the thermometer wells; 7 and 7'; 283° C. in the trap 9; and 275–280° C. in the screw conveyor. Steam removed from the trap 9 was 17 g. per minute and that from the screw conveyor about 1 g. per minute. The time of travel through the screw conveyor was estimated at about 30 minutes. The finished polymer was continuously extruded at 18 and quenched in water. When remelted the polymer showed a melt viscosity of 200 poises at 280° C.

*Example II*

A 60% solution in water of the diamine-dibasic acid salt mentioned in the preceding example, the said solution containing 1.5 molar per cent of acetic acid based on the salt content, was forced through two coils in series from a blowcase under 300 lbs. pressure. The temperature in the first coil was below that of saturated steam at 300 lbs. gage, whereas in the second coil the temperature was high enough to vaporize the water. From the second coil the reaction mixture passed into a trap maintained at 285° C. Steam was bled continuously from the trap. Liquid polymer was drawn from this trap, and heated for a few minutes in another vessel at 285° under atmospheric pressure. The finished polymer had a melt viscosity of 127 poises at 285° C. and an intrinsic viscosity of 0.70, where intrinsic viscosity is defined as in Patent 2,130,948.

The screw conveyor has been found to be particularly adapted to the present process and to contribute largely to its commercial practicability due to the fact that the required control of the time of passage of the polymer moving through the final stage can readily be obtained by this mechanism. The polymeric material as it enters the screw is a bubbly viscous mass from which steam would normally be evolved at a slow rate. The turning of the screw, however, serves to break up the bubbly character of the polymer mass and set free the steam. The screw is eccentric to the surrounding casing, permitting a gas passage along the entire upper length of the casing. This permits the free escape of steam during the passage of the polymer mass through the screw conveyor. Although the use of a screw conveyor for the final stage is preferred, it is possible to use other mechanical means for this purpose, as for instance buckets, belts, or even a slightly inclined plane.

In order to obtain the most useful products the polymerization reaction should be carried to the extent where the unreacted groups are reduced to a very low value as determined by water loss on melting the finished polymer in vacuo. In the continuous process described herein this condition is brought about by conducting the finishing stage of the reaction in the last zone for a substantial time under a partial steam pressure of not more than about 1.5 atmospheres.

Since the polymer-forming composition is fed to the polymerization compartments in fluid form, the compositions will usually contain some water or other solvent. In the case of diamine-dibasic acid salts, the water content of the composition will usually vary from 60 to 20%, preferably at lower values depending upon the salt. For hexamethylene diammonium adipate, a water content of 30 to 50% is preferred. The saturation temperature of the salt at these concentrations is 110° to 42° C., respectively, for the feed solution. Low water content is advantageous because the reaction is an equilibrium one and proceeds further toward polymer in the first stage, the less the water present. The sizes of the units in which steam is flashed are almost solely a function of the water content of the reaction mass. The disadvantage of too low water content is the necessity for storing and pumping the hot solution near its crystallization temperature.

The time required for the operation depends somewhat upon the nature and concentration of the polymer-forming composition. In the preparation of polyhexamethylene adipamide from the salt the first stage is of the order 15 to 30 minutes, the steam-flashing stage from 1 to 5 minutes, and the finishing off stage at atmospheric or lower pressure from 15 to 60 minutes. For most polymer-forming compositions the time of passage through the polymerization apparatus will range from one to three hours from start to finish.

The present process is applicable to the various types of linear-polymer-forming compositions disclosed in the previously mentioned patents. It is particularly well adapted to the preparation of polyamides, which include interpolyamides and interpolymers containing other groups in addition to amide groups in the main chain of atoms. Among the most useful of the polymer-forming compositions are aqueous solutions of salts of adipic or sebacic acid with such diamines as ethylenediamine, hexamethylenediamine and decamethylenediamine. Aqueous solutions of 6-aminocaproic acid or its lactam, with or without addition of other polyamide-forming reactants, e. g. diamine-dibasic acid salts, are also advantageously polymerized by the present process.

The process described herein is superior to previously used processes both from the standpoint of cost of production and from the standpoint of uniform quality of the product. The present process has the advantage of permitting not only the production of polymer in bulk form for cutting into chips or flakes for subsequent remelting and extrusion into useful articles, but also the direct production of these articles. For example, yarn, filaments, bristles, ribbons, film, coating-on-wire, etc., may be extruded directly from the polymer as it leaves the last stage in the polymerization cycle, thus avoiding the remelting operation for that purpose. Direct extrusion of the polymer into yarn or other fine structures is not generally practical in batch operations because of the degradation of the polymer which takes place during the long time required between the completion of the polymerization cycle and the completion of the extrusion operation. In the present process polymer is being formed continuously and can be extruded as fast as it is formed so that degradation of polymer is minimized.

The advantages of the present process are enhanced by reason of the fact that it may be carried out by simple apparatus comprising as little as two reaction coils or compartments and a single pump since the pressure needs to be built up but once.

As many apparently widely different embodiments of this invention may be made without departing from the spirit and scope thereof, it is to be understood that I do not limit myself to the specific embodiments thereof except as defined in the appended claims.

I claim:

1. A process for preparing polyamides which consists in continuously passing an aqueous solution of a diamine-dibasic carboxylic acid salt at superatmospheric pressure and at amide-forming temperatures through at least one compartment of a reaction assembly having several compartments, the temperature-pressure conditions in said compartment preventing the formation of steam and the rate of travel of said solution through said compartment being such that the major portion of said salt is converted to polyamide, then passing the reaction mass at amide-forming temperatures and at a pressure permitting the formation of steam through at least one additional compartment of the assembly while progressively removing water from the reaction composition as steam until the composition consists essentially of polyamide and the pressure is substantially atmospheric and continuously delivering molten polymer from the exit end of the reaction assembly.

2. A process for the continuous manufacture of polyamides which comprises passing an aqueous solution of diamine-debasic carboxylic acid salt through a reaction zone at amide-forming temperatures and under conditions of pressure and temperature which prevent the formation of a vapor phase and at such rate that the major portion of said salt combines to form polyamide, then passing the reaction amide-forming mass through a zone at reaction temperature and at a pressure permitting liberation of steam, removing steam with consequent reduction in pressure, and continuing the heating at amide-forming temperature of the partially formed polyamide during its flow through the second mentioned zone under a steam pressure of not more than about 1.5 atmospheres until polymerization is substantially completed.

3. The process set forth in claim 1 in which the polyamide-forming composition is an aqueous solution of the salt of adipic acid and a diamine.

4. A process for the continuous production of polyamides which comprises continuously feeding an aqueous solution of diamine-dibasic carboxylic acid salt through a reaction vessel at amide-forming temperature and under sufficient pressure to prevent the formation of a vapor phase and at such rate that the major portion of said salt reacts to form polyamide, passing the contents of said vessel through a subsequent reaction vessel at amide-forming temperature but at a pressure sufficiently low to bring about the formation of a vapor phase, progressively removing volatile product with continuation of the amide-forming reaction until the pressure is reduced to atmospheric.

5. A process for the continuous production of polyamides which comprises continuously feeding an aqueous solution of diamine-dibasic carboxylic acid salt containing water in amount of from 20 to 60% of said composition through a reaction vessel at amide-forming temperature and under sufficient pressure to prevent the formation of a vapor phase and at such rate that the major portion of said salt reacts to form polyamide, passing the contents of said vessel through a subsequent reaction vessel at amide-forming temperature but at a pressure which is lower than that in said first mentioned vessel and which is sufficiently low to cause liberation of steam, progressively removing the steam with continuation of the amide-forming reaction until the pressure is reduced to atmospheric, and continuously discharging the finished polymer.

6. A process for the continuous manufacture of synthetic linear polyamides and for the continuous formation of shaped articles direct from the polyamide as it is formed, said process comprising passing an aqueous solution of diamine-dibasic carboxylic acid salt through a reaction zone at amide-forming temperature and under pressure sufficient to prevent the formation of a vapor phase and at such rate that the major portion of said salt combines to form polyamide, then passing the reaction product formed through a reaction zone at amide-forming temperature where polymerization is completed by maintaining the reaction mass under pressure-temperature conditions at which the volatile products are liberated, and continuously extruding the polymer through a shaping orifice.

GUY B. TAYLOR.